Nov. 13, 1928.

E. W. ROBERTS 1,691,361

TOASTER

Filed June 6, 1927      3 Sheets-Sheet 1

Inventor
Edmund W. Roberts

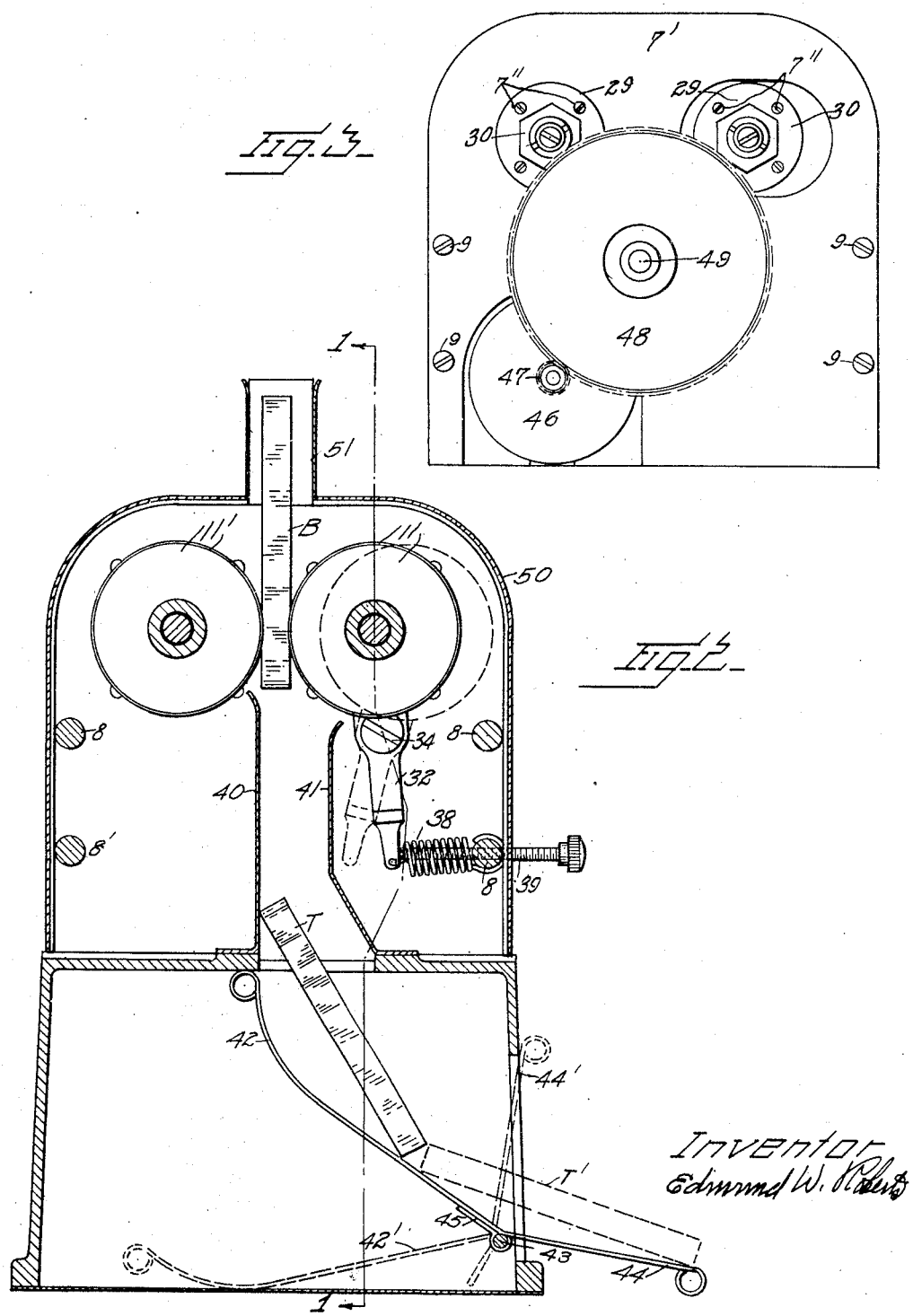

Nov. 13, 1928.  E. W. ROBERTS  1,691,361

TOASTER

Filed June 6, 1927  3 Sheets-Sheet 3

Inventor
Edmund W. Roberts

Patented Nov. 13, 1928.

1,691,361

UNITED STATES PATENT OFFICE.

EDMUND W. ROBERTS, OF CINCINNATI, OHIO.

TOASTER.

Application filed June 6, 1927. Serial No. 196,733.

Electric toasters of the automatic type have heretofore been limited in their output by the fact that the toasting has been effected by radiant heat while the bread, in the process of being toasted, is passing between and contiguous to a heating element or elements but not in actual contact with these elements. In such toasters as have been heretofore adapted to perform their functions with the bread in contact with the heated surface, the bread has either been laid upon such surface as upon a heated griddle, or it has been clamped between two heated surfaces and could not be traversed while in contact therewith. Experience has proven that bread may be toasted more rapidly and with less expenditure of electrical energy per unit of bread surface area, when the bread is in actual contact with the heated surface, than when it is in proximity only to said surface and not in contact therewith. Were the bread to traverse across a heated surface and in contact therewith, it would acquire a certain gloss or polish which is objectionable in finished toast. The time required to effect the toasting of a slice of bread by radiant heat is customarily from 45 seconds to two minutes and more, depending on the moisture content of the bread, and the condition of the toaster, the average time being 80 seconds when both sides of the slice are toasted at the same time.

The main object of my invention is to effect the toasting of a slice of bread in the shortest possible time and with the least expenditure of electrical energy. A second object of my invention is to make the process entirely automatic to such end that the slice of bread has merely to be inserted in the toaster by hand or automatic feeding means, and the toasted slice discharged from the toaster by the mechanism itself without the necessity of removing it therefrom by hand.

In practicing my invention, I provide a pair of parallel rollers mounted to rotate upon their axes, the rollers being provided with electrical heating elements just within the outer shell comprising the peripheral surface thereof, means for varying the distance between the rollers, and a motor to drive the rollers, one in a clockwise and the other in an anti-clockwise direction of rotation. The rollers being mounted with their axes in the same horizontal plane with the upper surfaces of their peripheries moving toward one another and inward, any object slightly greater in thickness than the distance between the rollers and inserted between them, will be drawn through the space and traversed vertically downward. When such object is a slice of bread, and the rollers have been heated previously to a toasting temperature, the bread will be toasted during its passage between the rollers and will be discharged from between them to fall therefrom by the force of gravitation.

In the drawings,

Fig. 2 is an end elevation in section along the line 2—2 of Fig. 1.

Fig. 3 is an end elevation of the upper portion with the cover removed as would be seen by an observer from the left of Fig. 1.

Figure 1:
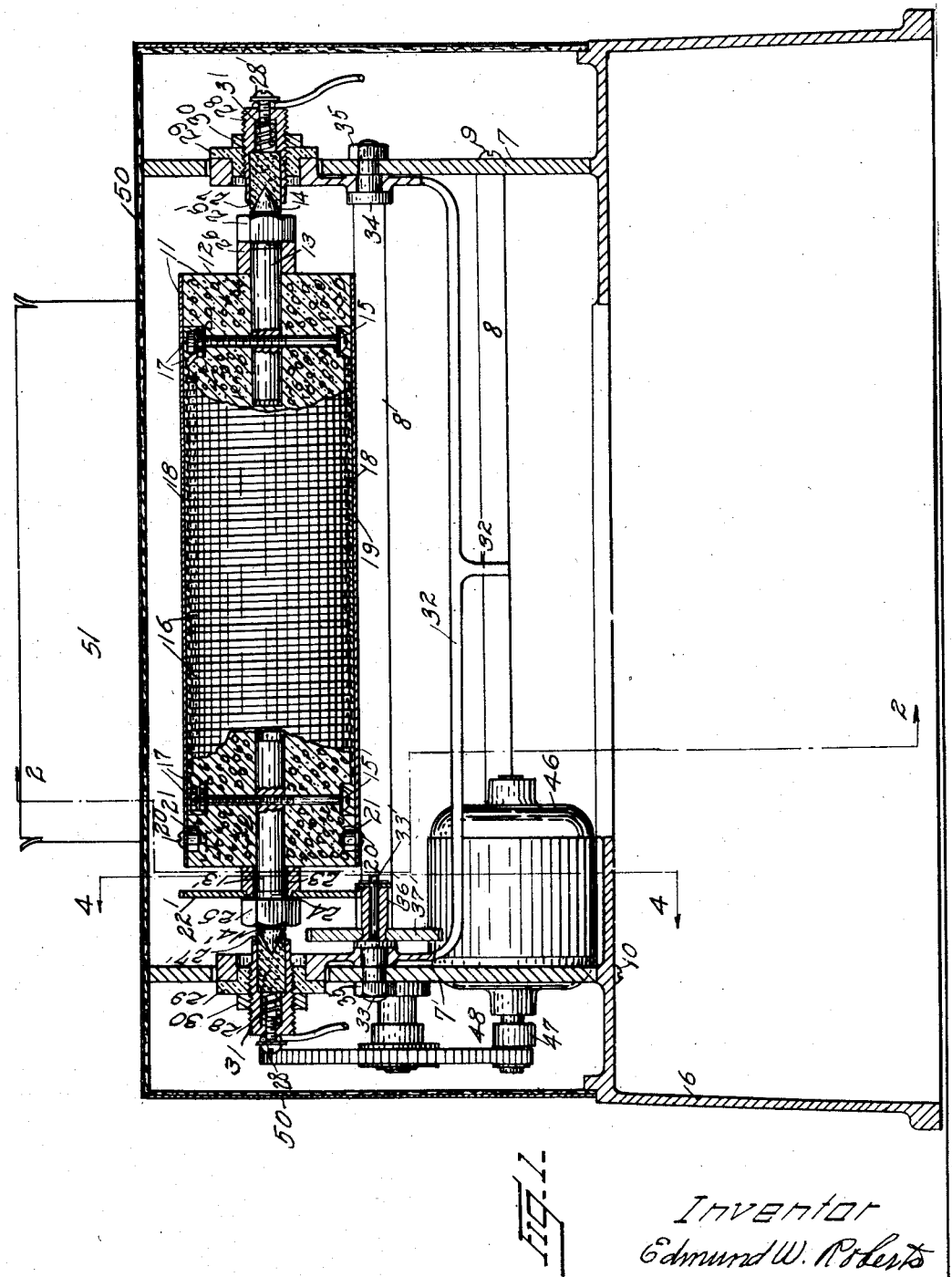
Fig. 1 is a side elevation, principally in section along the line 1—1 of Fig. 2, the central portion of the roller being shown with the outer shell only removed, the better to show the manner of mounting the heating element or resistance ribbon. In this figure, the guides for controlling the direction of the toast after leaving the rollers, have been omitted.

Mounted on the sub-base 6 is a frame comprised of the end plates 7, 7' joined by the stretcher bars 8, 8 clamped to the end plates by means of the screws 9, 9. With the exception of the motor, the entire mechanism is assembled on this frame. The frame is attached to the sub-base by the screws 10, entering end plate 7' only. The end plate 7 is free to move with the expansion and contraction of the bars 8, 8 for the reason that these bars are closer to the source of heat than the sub-base and are subject to greater expansion.

Between the end plates are mounted the toasting rollers designated generally by the numerals 11, 11', and constructed as follows: The central portion or core 12 is of material which is a non-conductor of both heat and electricity, and preferably a composition manufactured of asbestos and Portland cement under hydraulic pressure. In either end of this core are inserted the spindles 13, 13', preferably of steel. The ends of these spindles are fashioned into conical points 14, 14'. Crosswise of that portion of the spindles within the core are threaded the screws 15, 15'. The central portion of the core is reduced in diameter, and upon this portion is wound the resistance ribbon 16, preferably an alloy of nickel and chromium. The ends of ribbon 16 are clamped tightly between the nuts 17, 17 threaded on the ends of the screws 15, 15'. After winding the ribbon 16 and clamping the ends as described, the ribbon and the ends of the screws 15, 15' together with the nuts 17, 17 are covered with a layer of heat resistant cement designated by the numeral 18. For this purpose it is preferable to employ a cement which will not disintegrate under high temperature, but which is a fair conductor of heat, although a non-conductor of electricity. After the cement 18 has thoroughly dried, the roller is ready for mounting the shell 19, which may be of metal or porcelain, but preferably of pure nickel because of its non-corrosive properties and high melting point. The shell 19 is attached to the core by means of the screws 20, which pass through the shell and into the nuts 21, which have been previously cemented in the core 12. It should be noted that the shell is attached to the core at the one end only, to permit it to come and go as it expands and contracts with rise and fall of temperature, since expansion of the cement core with rise of temperature is practically nil.

Upon the end of the spindles 13' are mounted the gears 22, 22' which are insulated from the spindle by the mica bushings 23 and the mica washers 24. The gears are clamped to the end of the cores 12 by the nuts 25. Similar nuts 25' pressing against the collars 26, are threaded on the spindle 13. The nuts serve to hold the spindles firmly in place in the ends of the cores 12, their clamping action being resisted by the screws 15, 15'.

The rollers are mounted in the bearings 27, 27 which are fitted to the conical ends 14, 14' of the spindles. These bearings are preferably of graphite or a composition of bronze and graphite. It is essential that these bearings be of the so-called "oil-less" type for the reason that spindles attain a temperature approaching 250° Fahrenheit making them difficult to lubricate. Furthermore, the bearings perform the function of conductors, and a film of oil therein would be objectionable. The bearings 27, 27 are housed within the screws 28, 28, which are, in turn, mounted in the collars 29, 29, the collars being threaded to receive the screws. The collars are of some type of insulating material, preferably lava, a refractory manufactured from steatite. To retain the screws in place in the collars, there are provided the lock-nuts 30, 30. Within the screws 28 are springs 31, to ensure contact between the bearings 27, and the cone points 14, 14'. Screws 28' serve as binding posts to connect the leads from the mains.

Figure 4:
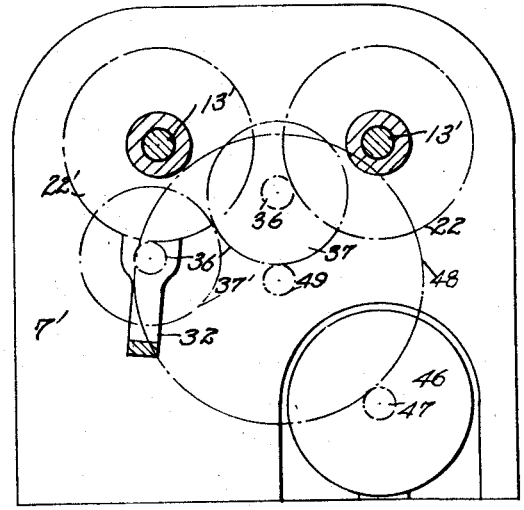
Fig. 4 is an end elevation of the upper portion with the cover removed, taken as of the section along the line 4—4 of Fig. 1, the gear train being indicated diagrammatically by the pitch circles of the gears and pinions.

Two of the insulating collars are attached to the end plates 7, 7' by the screws 7'' (Fig. 3), and carry the roller, 11'. Two collars are attached to the swing 32. The swing is pivoted to turn about the pins 33 and 34, which are clamped to the end plates by the nuts 35, 35. The pin 33 is provided with the extension 33', providing a mounting for the step gear comprised of the pinion 36 and the gear 37. A similar step gear comprised of pinion 36' and gear 37' is mounted on the end plate as indicated in Fig. 4. The swing 32 is provided with an extension 32' to which is hooked the tension spring 38 tending to swing the roller 11 toward the roller 11'. A screw 39 (Fig. 2) limits the movement of the swing. In Fig. 2 a slice of bread in the process of being toasted is designated by the letter B. A slice of toast just released from the rollers is designated by the letter T. A slice of toast just emerging from the toaster is indicated by a broken outline and designated by the letter T'.

Within the frame and attached to the sub-base 6 are the guides 40, 41 which serve to direct the toasted bread after it has passed from between the rollers. Within the sub-base 6, there is mounted to swing about the pin 43, the incline 42. Mounted on this same pin 43 and adapted to swing about this pin is the door 44. Extending from the door beyond the pin, and beneath the incline 42, is the finger 45. In its closed position, as designated by the broken line outline 44', the finger designated in this position by the broken line 45' is out of contact with the incline. The latter, relieved of the pressure of the finger, drops by its own weight to the position designated by the broken lines 42'.

The rollers 11, 11' are driven by the electric motor 46 through a gear train comprised of the following combination, as shown in Fig. 4. On the shaft of the motor is keyed the pinion 47 meshing with the gear 48. Gear 48 is keyed to the shaft of the pinion 49. The latter meshes with the gear 37' which is in mesh with the gear 37. Keyed to the gears 37 and 37' to turn therewith are the pinions 36, 36'. The latter are in mesh with the gears 22, 22' keyed to the spindles 13', 13'.

That portion of the machine above the sub-base is enclosed in the cover 50, provided with the feed hopper 51 attached thereto.

The toaster, as shown, is designed for toasting two slices of bread at one time. Its compactness may be appreciated by the fact that the drawing is to scale and approximately half size. To provide for toasting three or more slices at one time, it suffices merely to lengthen the machine and provide longer rollers.

Figure 5:
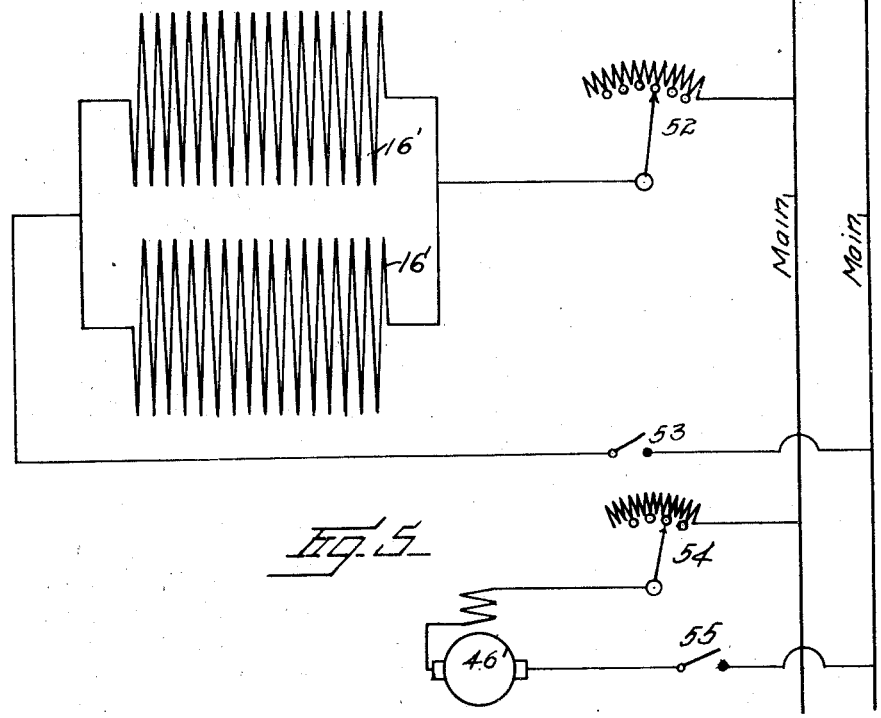
Fig. 5 is a diagram of the electric circuits.

In Fig. 5, the heater coils are designated by the numerals 16, 16'. These are connected by the mains as shown through the rheostat 52, and the switch 53. The motor, designated by the numeral 46', is connected to the mains through the speed controlling rheostat 54, and the switch 55. While the coils are shown in the figure connected in parallel, it is obvious that they may be wound with ribbon of lower resistance adapting them to be connected in series.

In the operation of my invention, the switch 53 is closed, and the rheostat 52 is set to impress the full voltage on the coils 16'. The current passing through the coils raises their temperature and the temperature of the roller shells 19 until they are hot enough to toast effectively. This may be determined by touching the surface of the rollers with a piece of bread. It has been found that when the rollers are too cold, the bread will stick to them. This condition exists until the temperature of the surface has exceeded 820° Fahr. Above that temperature, the bread may be toasted effectively. The lower the temperature, the more slowly must the rollers be rotated. It is my experience that temperatures between 1,050° and 1,100° Fahr. give satisfactory results.

After the rollers have been raised in temperature to that most effective for toasting, the switch 55 is closed starting the motor, and the speed of the motor is regulated by the rheostat 54. The temperature of the rollers is regulated by varying the amount of current flowing therethrough with the rheostat 52. A thermostatic control may be substituted for the hand-controlled rheostat 52 without departing from the spirit of the invention.

In operation, the performance of the toaster has fully attained the objects of the invention. The drawings show a two-slice toaster exactly as made and tested. The speed at which bread may be toasted varies with the condition of the bread itself and the temperature of the rollers. With the temperature of the rollers 1,050° to 1,100° Fahr. the speed of toasting will average about 1.4 linear inches per second. Hence a slice of bread four inches long may be toasted in less than three seconds.

When operated with full voltage across the heating coils 16, and all of the rheostat 52 cut out, the rollers require 858 watts each or a total of 1,760 watts. This should be compared with the wattage of 5,500 required for the toaster referred to in the first paragraph of this specification. Operating my toaster at the average speed of 85 linear inches per minute, and toasting slices averaging 4¼ inches long, two slices passing through between the rolls together, the speed of operation is 40 slices toasted per minute. This speed has actually been attained with bread of average moisture content. Dryer bread may be toasted at a much higher speed.

Referring once more to the toaster taken as a basis of comparison, and which has a capacity of eight slices of bread toasted in 80 seconds, it must be taken into consideration that this toaster must be loaded before the toasting operation is begun and the toast must thereafter be removed. The elapsed time from the start of loading until the toaster is unloaded is two minutes. In that same period, my toaster will produce eighty slices of toast or ten times the output of the former. Hence the objects of the invention are attained; namely, much greater speed of production, comparatively low current consumption, and automatic delivery of the finished product.

I claim:—

1. In a toaster, in combination, a pair of rotatable cylindrical rollers, heating means within the rollers, the axes of the rollers substantially in parallel, and means including a motor adapted to rotate the rollers.

2. In a toaster, a pair of cylindrical rollers, the rollers pivoted to rotate, heating means within the rollers, the axes of the rollers in parallel, the rollers by their rotation adapted to traverse a slice of bread therebetween by traction, the surface of the slice being in contact with the rollers, and the rollers adapted to toast the bread during its passage between them.

3. In a toaster, a pair of parallel cylindrical rollers, the rollers pivoted to rotate, rotating means including a motor, the rollers adapted to traverse a slice of bread therebetween by traction, the bread in contact with the surfaces of the rollers, heating means within the rollers, and the rollers adapted to toast the bread during its passage between them by the heat from said heating means.

4. A toaster comprising a pair of parallel cylindrical rollers, heating means provided for maintaining the rollers at a temperature suitable for toasting, power means, and driving means connecting the rollers with the power means.

5. A toaster comprising cylindrical rollers in parallel, shells of heat conducting material comprising the peripheral surface of the rollers, cores within the shells comprised of insulation of low heat conductivity, spindles in the cores and projecting from the ends thereof, the spindles of conducting material as metal, screws crosswise of the spindles and threaded therein, the screws passing into the spindles through the cores, a helix of resistance conductor comprising a heating unit; and the resistance conductor in electrical connection with the spindles through the screws.

6. A toaster comprising cylindrical rollers in parallel, shells of heat conducting material comprising the peripheral surfaces of the rollers, cores within the shells comprised of insulation of low heat conductivity, spindles in the cores and projecting from the ends thereof, screws crosswise of the spindles and threaded therein, the screws passing into the spindles through the cores, a helix of resistance conductor comprising a heating unit, the resistance conductor in electrical connection with the spindles through the screws, the spindles mounted in bearings to turn, binding posts on the bearings adapted to connect the bearings with a source of current supply, and the circuit thus established through the heating unit by way of the bearings and spindles and the screws in the order named.

7. In a toaster comprising cylindrical rollers, electric heating units within the rollers, spindles in the ends of the rollers and projecting therefrom, the terminals of the heating units in electrical connection with the spindles, the spindles mounted in bearings to turn, a source of current supply, the bearings in electrical connection with the source of current supply and adapted to transmit current from said source to the heating unit through the spindles.

8. In a toaster, a pair of parallel cylindrical rollers adapted to be heated, and when heated to toast bread in contact therewith, the rollers adapted to rotate on their axes, and by such rotation to traverse the bread between said rollers by traction when the bread is in process of being toasted.

9. In a toaster, a pair of parallel cylindrical rollers, the rollers adapted to be heated, and when heated to toast bread in contact therewith, the rollers adapted to rotate on their axes, and by such rotation to traverse the bread therebetween by traction when said bread is in process of being toasted, gears on the rollers and fixed thereto, a gear train, the gear train in driving connection with the gears on the rollers, the gear train so connecting the rollers that they must rotate in opposite rotative directions, and by such opposite rotation to traverse a slice of bread between them by traction.

10. In a toaster comprising rollers in parallel, a core of heat resisting insulation, a resistance wire on the core comprising a heating unit, a tube of heat conducting material surrounding the core, and means for establishing electrical connection with the terminals of the heating unit.

11. In a toaster comprising rollers pivoted to rotate, cores of heat resistant insulation central of the rollers, a resistance wire on the core comprising a heating unit, tubes of heat conducting material surrounding the cores, spindles in the cores, cone points on the spindles, graphite cylinders comprising bearings, the cone points in the bearings and the spindles in electrical connection with the heating units.

12. In a toaster, the combination of rotatable rollers in parallel, rotating means including gears on the rollers, a motor, a gear on the spindle of the motor, a plurality of gears in mesh comprising a gear train, the gear train in mesh with the gears on the rollers and with the gear on the motor, and the motor thereby adapted to rotate the rollers.

13. A toaster comprising a frame, a swing pivotally mounted in the frame to oscillate, a pair of rollers, shafts in the rollers and extending therefrom, bearings in the frame, bearings in the swing, the shaft of one roller in the bearings on the swing, the shaft of the second roller in the bearings on the frame, and the axes of the rollers in parallel.

14. In a toaster comprising a frame, rollers, bearings in the frame, a roller mounted in said bearings to rotate, a swing, the swing pivoted on the frame, bearings in the swing, a second roller mounted in the said bearings to rotate, the rollers in parallel, and heating units within the rollers.

15. In a toaster comprising a frame, rollers, heating units within the rollers, bearings on the frame, a roller mounted in said bearings to turn, a swing, the swing pivoted on the frame, bearings in the swing, a roller mounted in said bearings to turn, the rollers in parallel, a spring, one end of the spring attached to the swing, the opposite end of the spring attached to the frame, and the spring adapted to reduce the distance between the rollers.

16. In a toaster comprising a frame, rollers, heating units within the rollers, bearings in the frame, a roller mounted in said bearings to turn, a swing, the swing pivoted on the frame, bearings in the swing, a roller mounted in said bearings to turn, the rollers in parallel, a spring, one end of the spring attached to the frame, the spring adapted to reduce the distance between the rollers, a screw comprising an adjustable stop, the screw in the frame, the end of the stop in contact with the swing, and the stop adapted to limit the distance by which the spring may reduce the distance between the rollers.

17. In a toaster comprising a base, an opening provided in the base providing an inlet thereto, a second opening provided in the base providing an exit therefrom, a door pivoted on the base to oscillate, the door adapted to close the exit, an inclined guide, the guide pivoted to oscillate, the guide adapted to receive toast from the toaster as it enters the base through the inlet thereto, the guide adapted to direct the toast through the exit when the said guide is turned toward the top of the base, the guide adapted to swing downward and rest on the floor of the base, the guide and the door interconnected in such manner that the opening of the door will raise the guide toward the top of the base and the closing of the door will permit the guide to swing downward to the floor of the base.

In testimony whereof I hereunto affix my signature.

EDMUND W. ROBERTS.